US 6,745,876 B2

(12) United States Patent
Beck (10) Patent No.: US 6,745,876 B2
(45) Date of Patent: Jun. 8, 2004

(54) PISTON-CYLINDER ASSEMBLY (75) Inventor: Hubert Beck, Eitorf (DE)

(73) Assignee: ZF Sachs AG, Eitorf (DE)

( * ) Notice: Subject to any disclaimer, the term of this patent is extended or adjusted under 35 U.S.C. 154(b) by 0 days.

(21) Appl. No.: 10/245,516

(22) Filed: Sep. 17, 2002

(65) Prior Publication Data
US 2003/0051955 A1 Mar. 20, 2003

(30) Foreign Application Priority Data

Sep. 17, 2001 (DE) .......................................... 101 45 784

(51) Int. Cl.[7] .................................................. F16F 9/53
(52) U.S. Cl. ................................ 188/267.2; 188/266.1
(58) Field of Search .......................... 188/266.1, 266.2, 188/316, 284, 267.2; 92/5 R, 5 L; 342/118–146; 73/290 V; 91/1

(56) References Cited

U.S. PATENT DOCUMENTS

| | | | | | |
|---|---|---|---|---|---|
| 4,096,747 A | * | 6/1978 | Gilson | ......................... | 73/251 |
| 4,577,509 A | | 3/1986 | Moser | ......................... | 73/658 |
| 4,629,059 A | * | 12/1986 | Allinquant | ............... | 198/463.3 |
| 4,650,042 A | * | 3/1987 | Knecht et al. | ............ | 188/266.6 |
| 4,749,070 A | * | 6/1988 | Moser et al. | ............. | 188/266.2 |
| 4,846,317 A | * | 7/1989 | Hudgens | .................. | 188/266.5 |
| 4,883,150 A | * | 11/1989 | Arai | ............................ | 188/289 |
| 5,007,659 A | * | 4/1991 | Guy | ......................... | 280/5.515 |
| 5,115,186 A | * | 5/1992 | Reinartz et al. | ........ | 324/207.22 |
| 5,123,671 A | * | 6/1992 | Driessen et al. | ......... | 280/5.519 |
| 5,392,632 A | * | 2/1995 | Umeda et al. | ................ | 73/1.73 |
| 5,438,261 A | * | 8/1995 | Codina et al. | ......... | 324/207.16 |
| 6,053,488 A | * | 4/2000 | Forsbach et al. | ............ | 267/221 |
| 6,203,288 B1 | * | 3/2001 | Kottke | ........................ | 417/328 |
| 6,250,612 B1 | * | 6/2001 | Doll | ......................... | 267/64.11 |
| 6,305,673 B1 | * | 10/2001 | Delorenzis et al. | ...... | 267/64.13 |
| 6,318,524 B1 | | 11/2001 | Lutz et al. | ................... | 188/284 |
| 2003/0075403 A1 | * | 4/2003 | Demebo | ..................... | 188/284 |

FOREIGN PATENT DOCUMENTS

| | | | | |
|---|---|---|---|---|
| DE | 3643290 A1 | | 6/1988 | ............ G01B/7/02 |
| JP | 63312533 | * | 12/1988 | |
| JP | 2002193100 | * | 7/2002 | |

\* cited by examiner

Primary Examiner—Douglas C. Butler
Assistant Examiner—Devon Kramer
(74) Attorney, Agent, or Firm—Cohen, Pontani, Lieberman & Pavane (57) ABSTRACT

A piston-cylinder assembly includes a cylinder, in which a piston rod with a piston is guided axially by a piston rod guide. A distance detection system is used to determine the position of the piston in the cylinder. The distance detection system includes a sensor and a transmitter. The sensor is mounted on the piston or on the bottom of the cylinder. Upon axial displacement of the piston, the transmitter travels a distance different from that traveled by the piston, the difference between the two distances being used to determine the position of the piston.

7 Claims, 12 Drawing Sheets

PISTON-CYLINDER ASSEMBLY

BACKGROUND OF THE INVENTION

1. Field of the Invention

The present invention relates to a piston-cylinder assembly, comprising a cylinder, a piston rod with a piston guided axially by a piston rod guide in the cylinder, and a distance detection system for detecting the position of the piston in the cylinder.

2. Description of the Related Art

Devices for determining the distance traveled by a piston of a hydraulic, pneumatic, or hydropneumatic system are known, for example, from U.S. Pat. No. 4,577,509 (Moser), in which the cylinder includes an additional tube in the interior cylindrical space thereof which forms a variable capacitor with the piston rod. The sensor and the measurement value transmitter are designed to extend down the entire length of the cylinder or of the piston rod and therefore require a corresponding amount of space.

Piston-cylinder assemblies with motion detection devices are also known from U.S. Pat. No. 6,318,524 (Lutz et al.). These assemblies comprise a cylinder and a piston rod with a piston is guided axially in a piston rod guide. The motion detection device comprises a transmitter and a receiver, where the movement of the piston is determined from the transit time of the waves generated by the transmitter. The transmitter and the receiver are installed inside the piston rod guide. The waves reflected from the piston-piston rod assembly are evaluated to determine the movement of this assembly.

Devices for determining the distance traveled by a piston in a cylinder for hydraulic or hydropneumatic systems such as vibration dampers are also known, for example, from German reference DE 36 43 290 C2. Here the piston on its piston rod is mounted with freedom to slide axially inside at least one damping medium-filled cylinder. A Hall sensor connected to the piston rod is used to detect the level. A part of the natural outside surface of the cylinder and at least a part of the natural surface of the piston rod are used as the measurement section.

SUMMARY OF THE INVENTION

An object of the present invention is to create a standard distance detection system that is compact, can be built at low cost, and which can be integrated into any type of shock absorber, piston-cylinder assembly, or automatic level-control element.

The object of the present invention is met by a distance detection system comprising a sensor and a transmitter, wherein the sensor is mounted on either the piston or the bottom of the cylinder and wherein the transmitter travels a distance different from that traveled by the piston upon axial displacement of the piston. The difference between the two distances traveled by the piston and the transmitter, respectively, being used to determine the position of the piston.

The distance detection system of the present invention may be integrated into shock absorbers, piston-cylinder assemblies, or automatic level-control elements, even if the assemblies have different lengths. The need to keep large numbers of different types of sensors and transmitters in stock for different lengths is obviated. Instead, systems of standard parts can be used.

The transmitter may be supported by at least one spring on the piston and by at least one spring on the bottom of the cylinder, wherein these springs have different spring rates. Furthermore, several springs may be connected in series, where at least one spring is supported in the piston area, while the other springs are supported on the bottom area of the vibration damper and thus hold the transmitter at a certain position relative to the sensor, the exact position being a function of the position of the piston.

As stated above, the sensor may be mounted on either the piston or the bottom of the cylinder. In one embodiment of the present invention, the spring or springs between the part that the sensor is mounted and the transmitter are designed with a higher spring rate than the other spring or springs.

To ensure the satisfactory guidance of the springs when several springs are connected in series in especially long assemblies, a guide element may be provided for guidance on the inside wall of the cylinder between each pair of adjacent springs.

The transmitter may be guided so that it slides axially on the sensor or so that the transmitter is coaxial to and a certain distance away from the sensor.

The distance detection system may also be designed so that it is based on the principle of a gap measurement. That is, the end surface of the sensor may cooperate with an end surface of the transmitter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
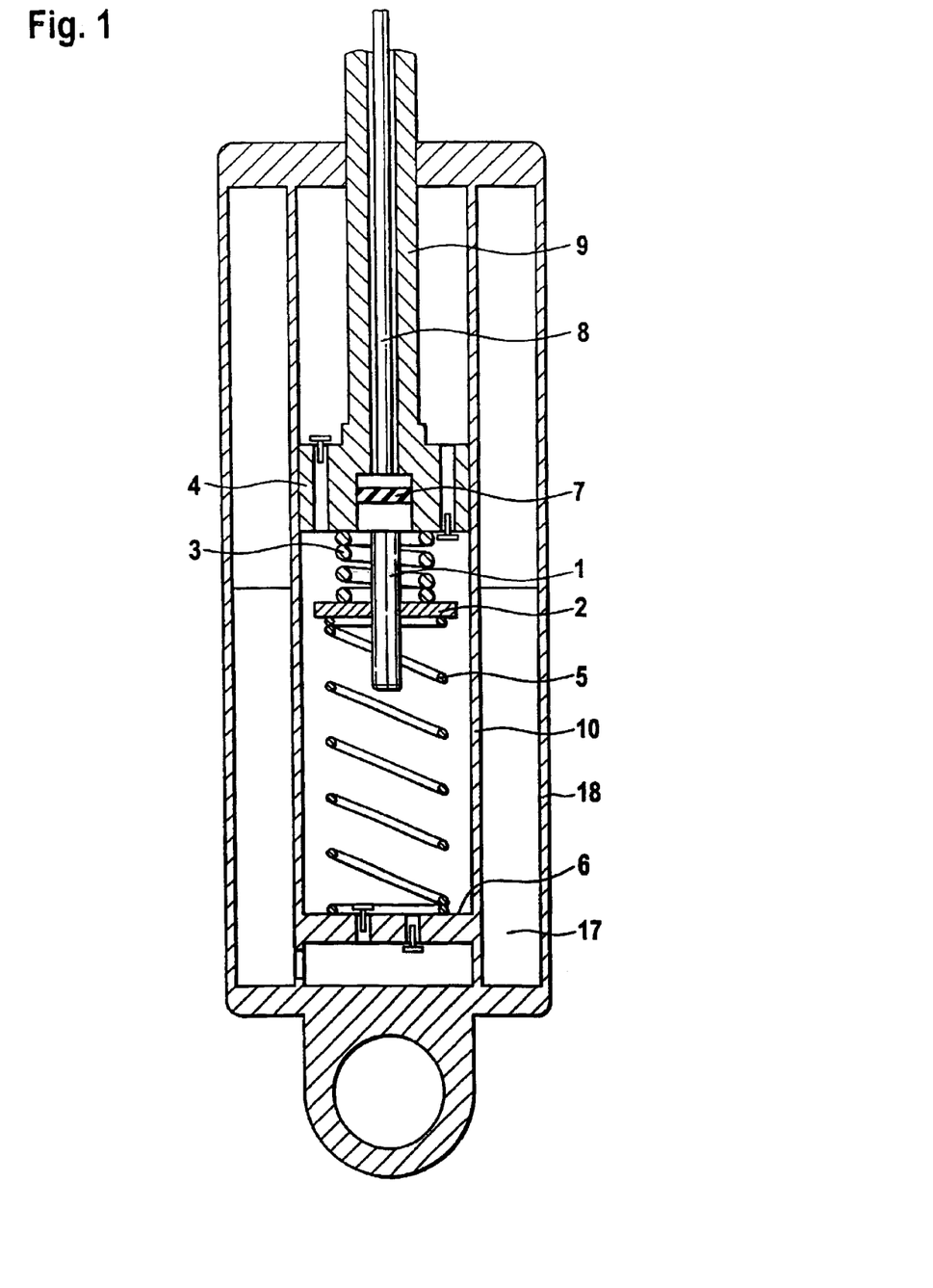
FIG. 1 is a longitudinal sectional view of a piston-cylinder assembly with a distance detection system according to the present invention.

FIG. 1 shows a piston-cylinder assembly comprising a twin-tube damper which includes a piston 4 guided in a cylinder 10 by a piston rod 9. An equalization space 17 is provided inside a jacket tube 18 coaxial to the cylinder 10. This twin-tube damper is of a known design and is provided with a compact distance detection system according to the present invention. The distance detection system includes a sensor 1 around which a transmitter 2 is mounted. In this embodiment, the sensor 1 comprises a coil. A first spring 3 is supported between the piston 4 and the transmitter 2 and a second spring 5 is supported between the transmitter 2 and the bottom 6 of the cylinder 10. A seal 7 is inserted in the piston 4 between the space defined by the cylinder 10 and the piston, which is filled with damping medium, and the electrical line 8 which is arranged in the piston rod 9 and connected to the sensor 1.

When the piston rod 9 moves in and out of the cylinder 10, the different spring rates of the springs 3 and 5 cause the distances traveled by the transmitter 2 and the piston 4 to differ in a certain ratio. The distance traveled by the piston 4 is much greater than that which the transmitter 2 travels in relation to the sensor 1. Through appropriate selection of the springs 3, 5, the distance detection system may be used in piston-cylinder assemblies or shock absorbers of different lengths.

The piston-cylinder assembly shown here could, for example, supply signals for a light-range regulator.

Figure 1A:
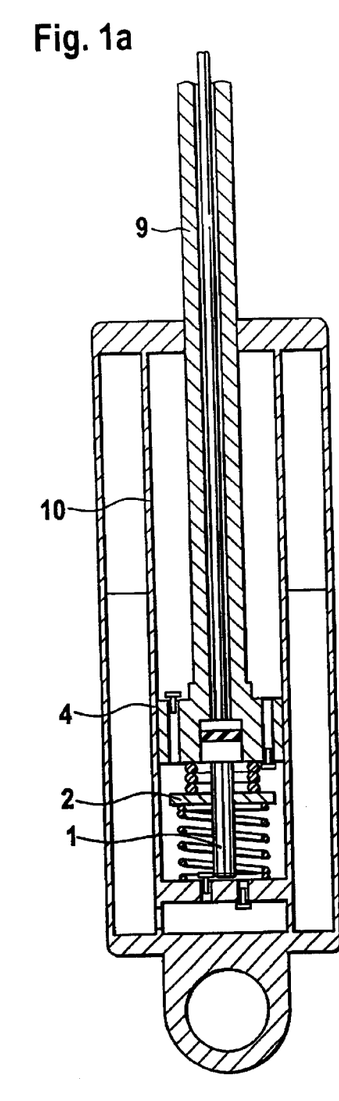
FIG. 1a is a longitudinal sectional view of the piston-cylinder assembly of FIG. 1 in which the piston rod is fully inserted in the cylinder.
Figure 1B:
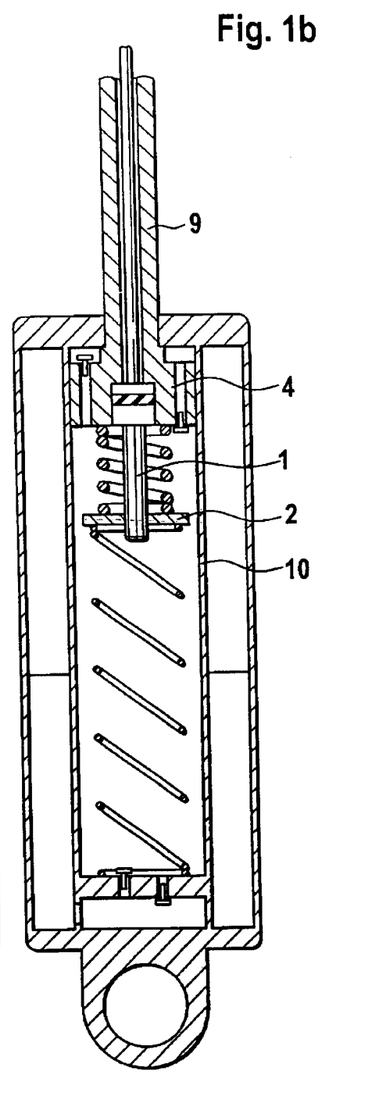
FIG. 1b is a longitudinal sectional view of the piston-cylinder assembly of FIG. 1 in which the piston rod is in the fully withdrawn state.

FIGS. 1a and 1b show the positions which the piston 4 occupies inside the cylinder when the piston rod is pushed all the way in (FIG. 1a) and when it is pulled all the way out (FIG. 1b). When the piston rod 9 is pushed all the way in as shown in FIG. 1a, the transmitter 2 surrounding the sensor 1 is close to the piston 4, whereas when the piston rod 9 is pulled all the way out as shown in FIG. 1b, the transmitter 2 is much farther away from the piston 4. The different positions of the transmitter relative to the piston produce different signals which can be evaluated appropriately by a suitable electronic circuit.

Figure 2:
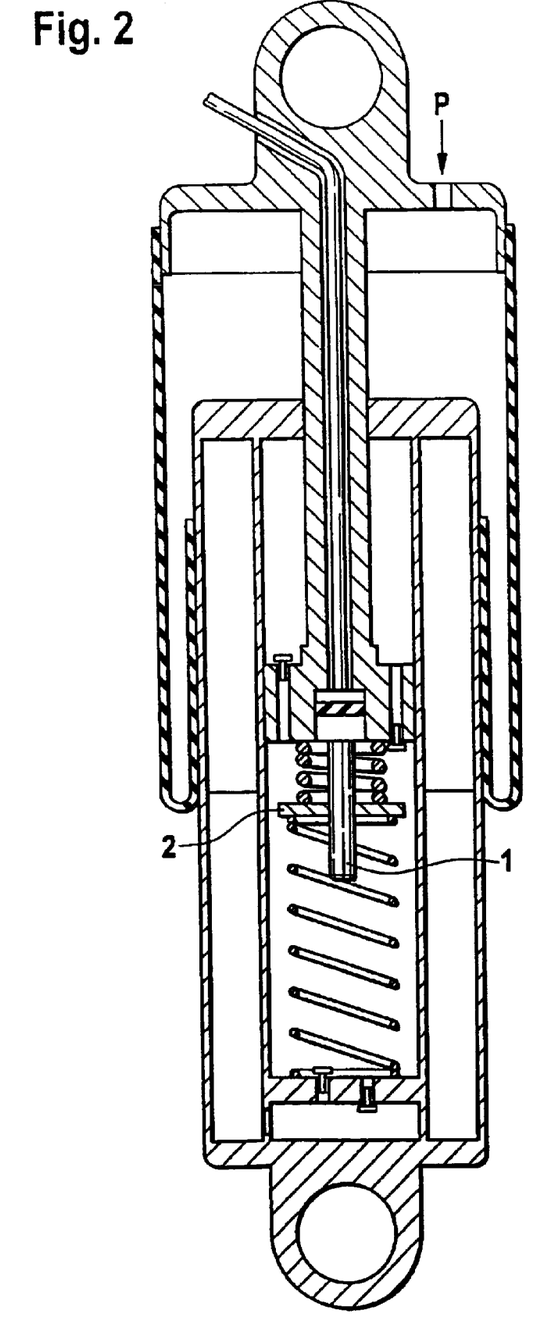
FIG. 2 is a longitudinal section view of a shock absorber including the distance detection system of the present invention.

FIG. 2 shows a piston-cylinder assembly comprising a shock absorber designed as a pneumatic spring. When installed in this device, the sensor 1 and transmitter 2 may be used to control the height of the vehicle body above the surface of the road.

Figure 3:
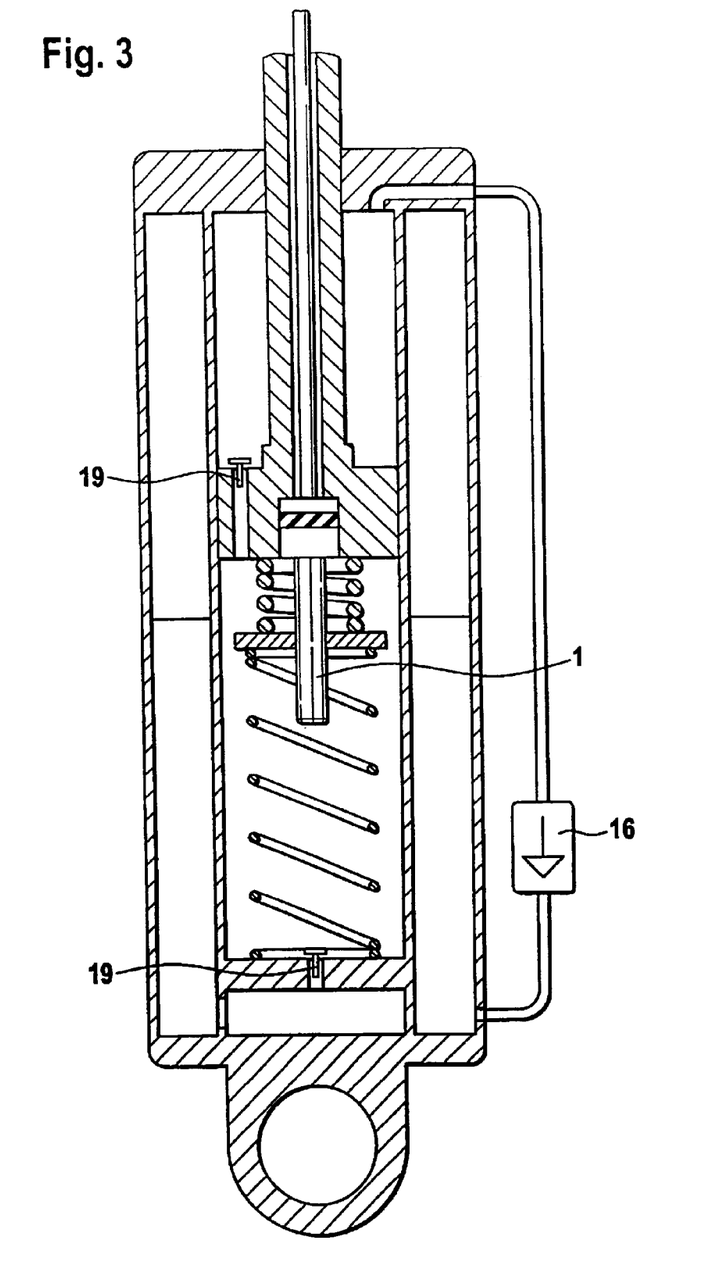
FIG. 3 is a longitudinal section view of a twin tube damper including the distance detection system of the present invention.

FIG. 3 shows a piston-cylinder assembly comprising a known twin-tube damper including the sensor 1 and transmitter 2 in which damping medium is pumped around a circuit via nonreturn valves 19 and controlled by an electromagnetically adjustable damping valve 16. The signal produced by the sensor 1 may be used as required to vary the damping.

Figure 4:
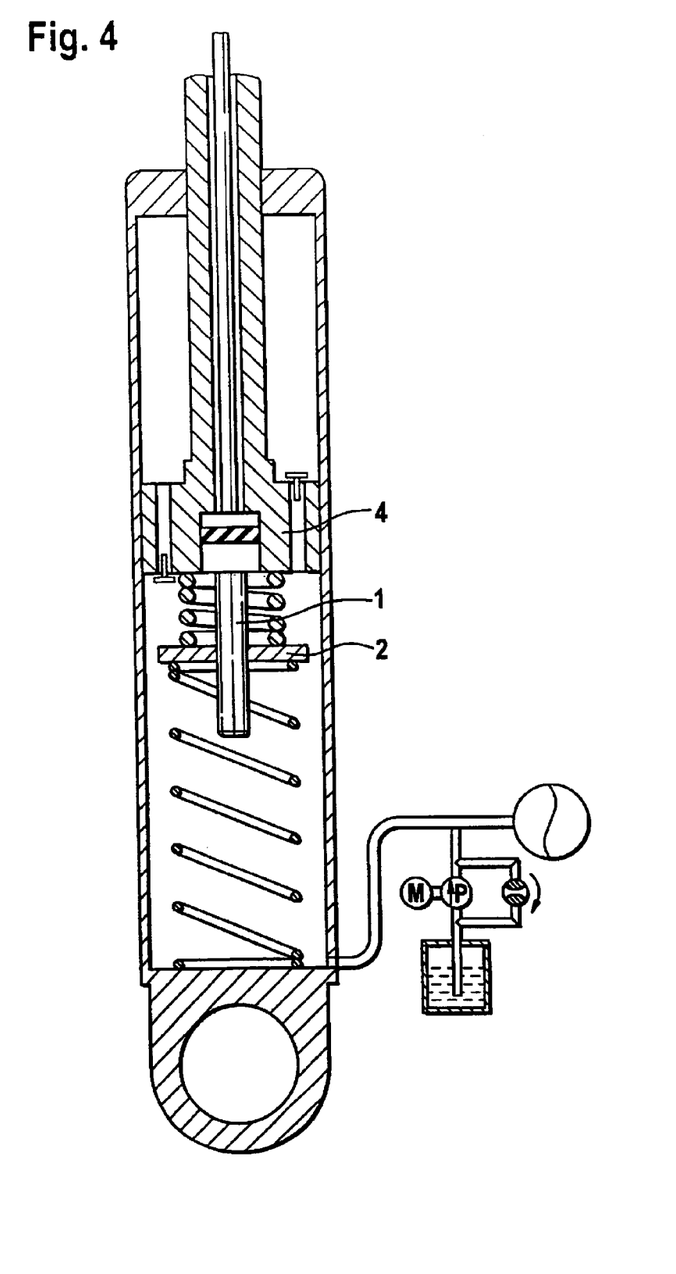
FIG. 4 is a longitudinal section view of a spring-cylinder arrangement including the distance detection system of the present invention mounted on the piston.
Figure 5:
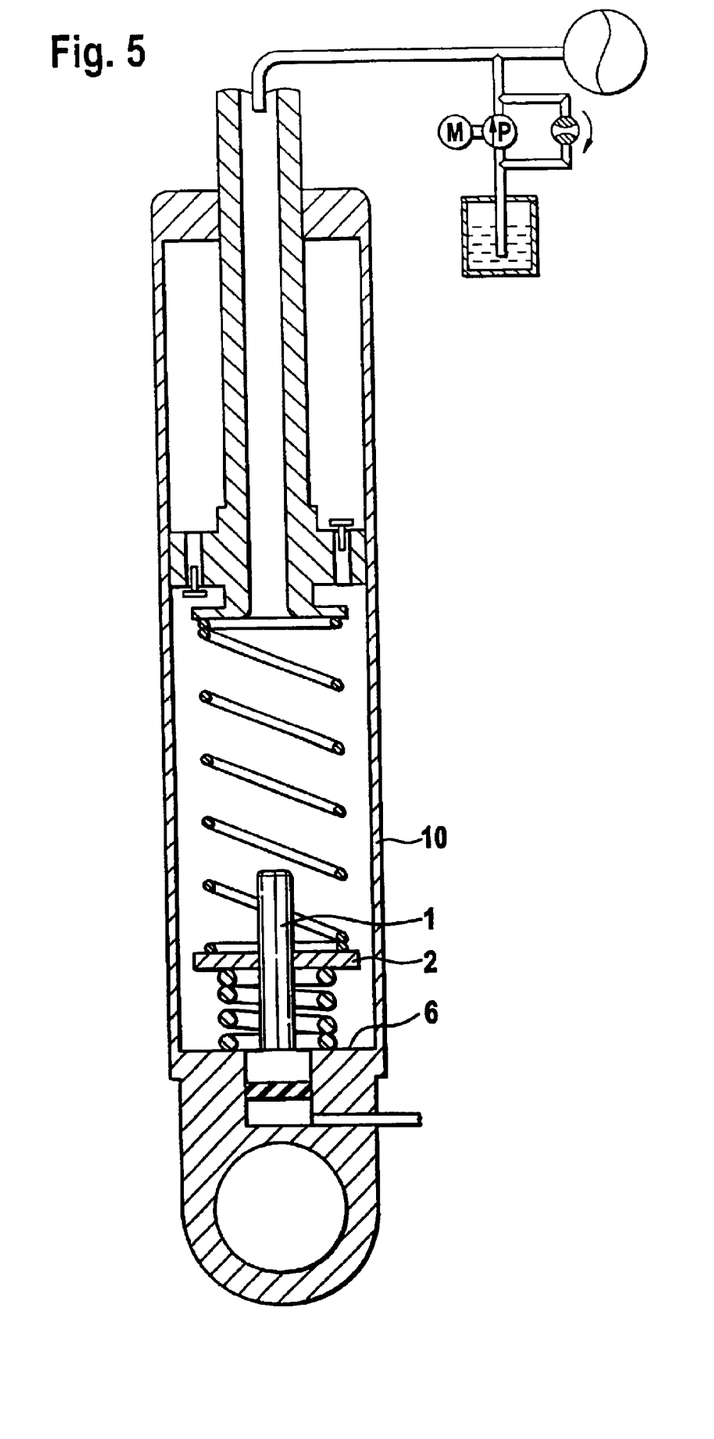
FIG. 5 is a longitudinal section view of a spring-cylinder arrangement including the distance detection system of the present invention mounted on the bottom of the cylinder.

FIG. 4 shows a piston-cylinder assembly comprising a spring-cylinder arrangement with an integrated distance detection system including sensor 1 and transmitter 2 installed in the area of the piston 4. FIG. 5 shows the same spring-cylinder arrangement as FIG. 4 with the integrated distance detection system arranged proximate the bottom 6 of the cylinder 10. The signals generated by the sensor 1 may be used for the automatic control of the height of the vehicle in the spring-cylinder embodiments of FIGS. 4 and 5.

Figure 6:
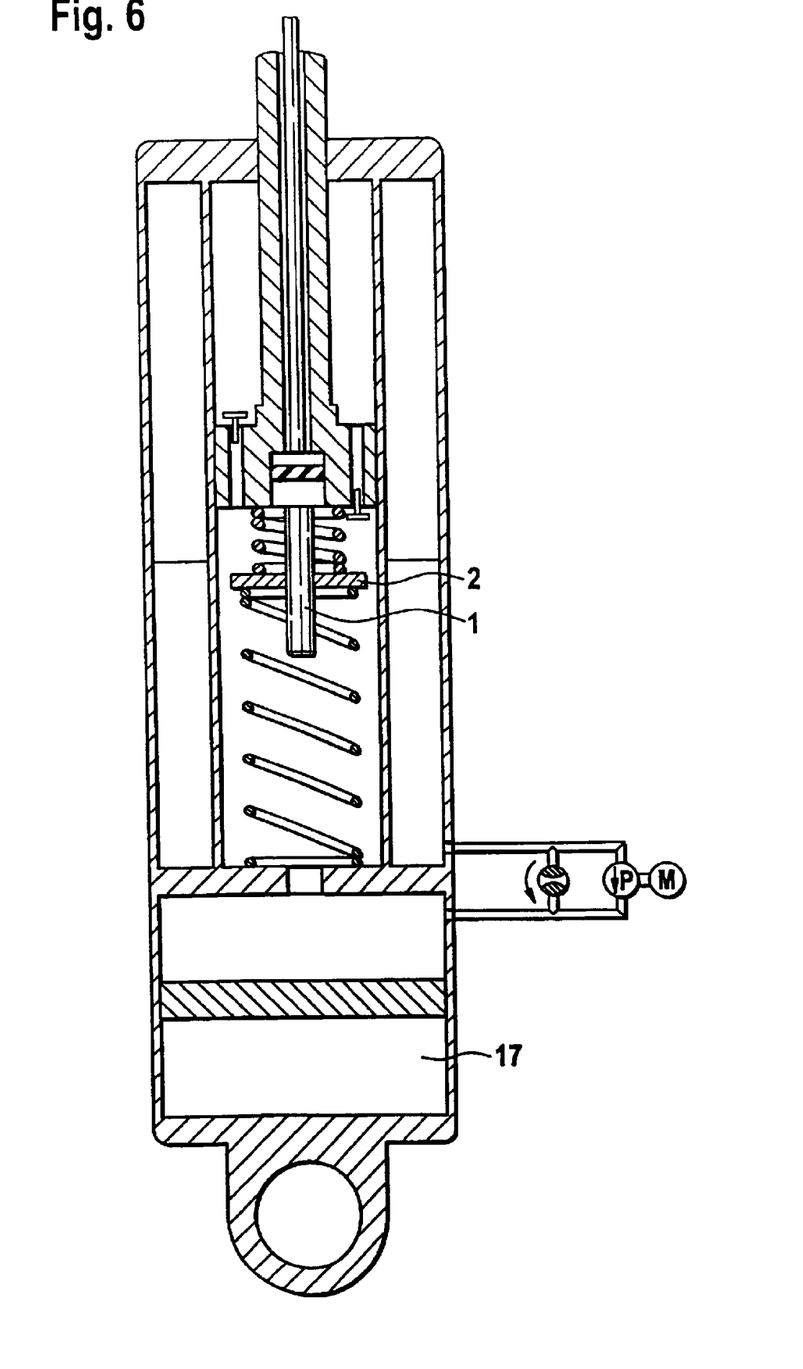
FIG. 6 is a longitudinal section view of a spring-cylinder with an integrated equalization space including the distance detection system of the present invention.

Another embodiment of a piston-cylinder assembly comprising a spring cylinder with an integrated equalization space 17 is shown in FIG. 6. In this embodiment, measurement values generated by the sensor 1 and the transmitter 2 are also used for automatic height control. In contrast to FIGS. 4 and 5, the embodiment of FIG. 6 has a compact design with an integrated tank.

Figure 7:
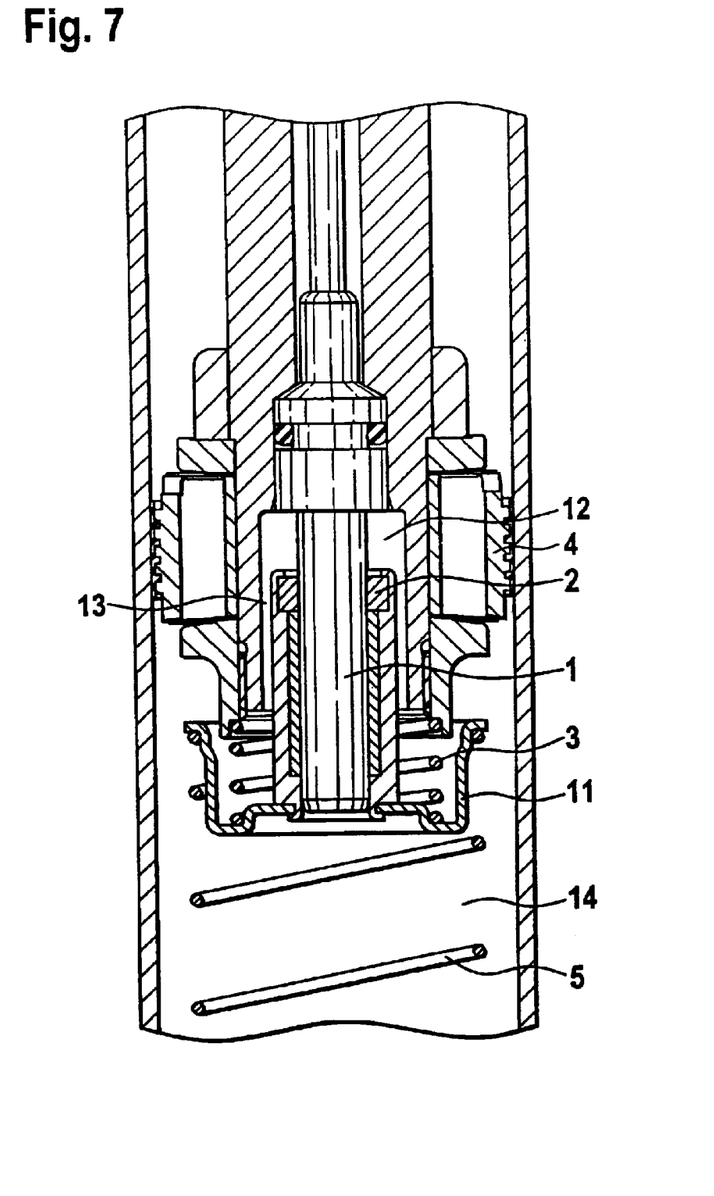
FIG. 7 is a longitudinal sectional view showing an embodiment of the distance detection system of the present invention.

FIG. 7 shows a piston-cylinder assembly comprising a vibration damper in which the piston 4 has a sensor 1 and the transmitter 2 is arranged so that it slides axially on the sensor 1. The transmitter 2 is connected to an intermediate part 11 and supports one end of the spring 5, the other end of which is supported on the bottom 6 of the cylinder 10. The spring 3 is located between the piston 4 and the intermediate part 11. This arrangement allows the travel ratio between the sensor 1 and the transmitter 2 to be set to almost any desired value. To achieve an especially favorable, compact design, the intermediate part 11 is made in the shape of a cup, and the received end of spring 3 is installed inside the cup, coaxial to the spring 5. The ends of the springs 3, 5 received at the intermediate part may therefore overlap, thereby allowing the axial dimension of the design to be minimized. A distance detection system of the type shown in FIG. 7 could operate according to the eddy current principle.

Figure 8:
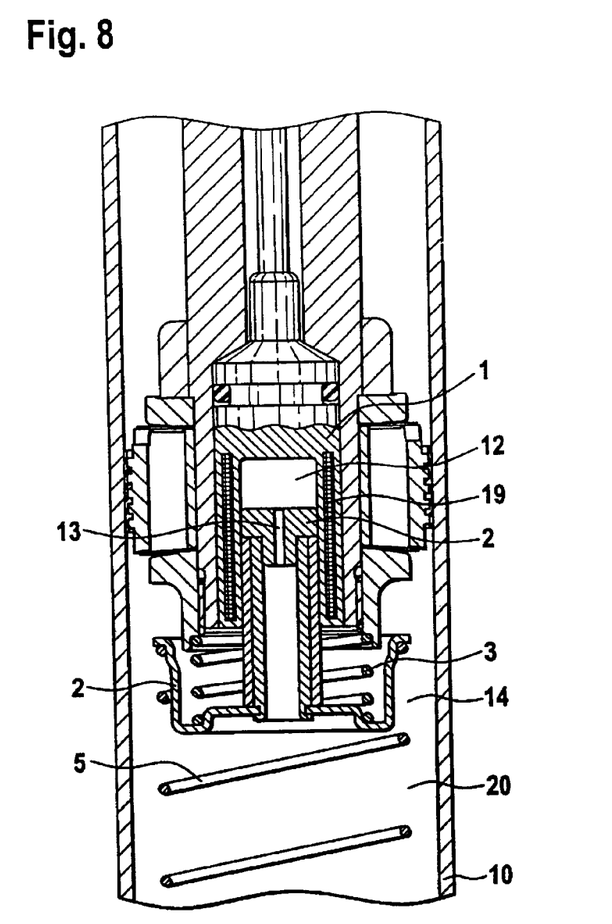
FIG. 8 is a longitudinal sectional view showing an embodiment of a further distance detection system of the present invention.

FIG. 8 shows an embodiment similar to the embodiment of FIG. 7, with the sensor 1 including a coil 19. The transmitter 2 can move back and forth inside the coil 19 of the sensor 1. To allow the pressure to equalize between a working space 14 defined by the cylinder 10 and the piston 4 and the space 12 between the transmitter 2 and the sensor 1, the transmitter 2 includes a flow connection 13.

The movement of the transmitter 2 may be damped to various degrees depending on the size and cross section of the flow connection 13. The damping function and the spring rates of the spring 3 and of the spring 5 may be coordinated to produce the desired relative movement of the transmitter 2 relative to the sensor 1.

Figure 9:
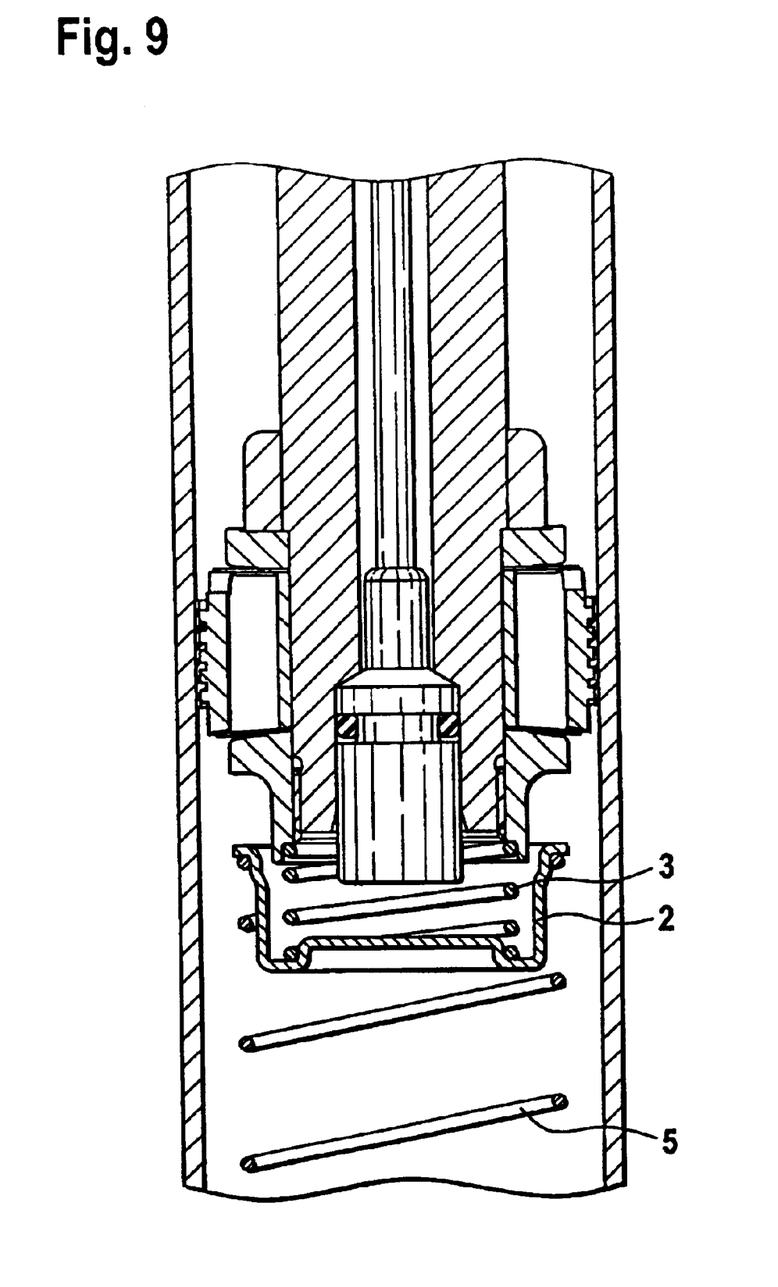
FIG. 9 is a longitudinal sectional view showing an embodiment of a further distance detection system of the present invention.
Figure 10:
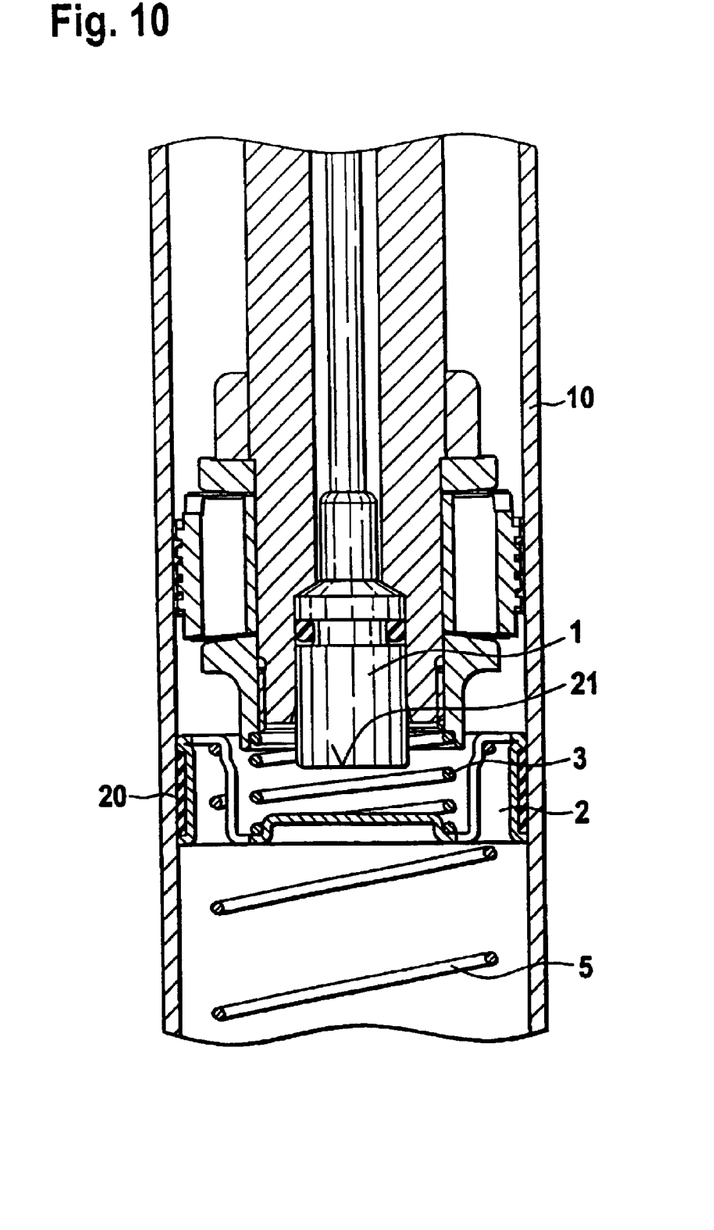
FIG. 10 is a longitudinal sectional view showing an embodiment of a further distance detection system of the present invention.

FIG. 9 shows an arrangement in which the transmitter 2 is supported in a floating manner on the springs 3 and 5. In contrast, FIG. 10 shows an embodiment in which the transmitter 2' is supported on the springs 3 and 5 and simultaneously is guided in the cylinder 10 by an appropriate exterior wall 20. The end surface 21 of the sensor 1 in this embodiment measures the distance between the end surface 21 and the transmitter 2.

Figure 11:
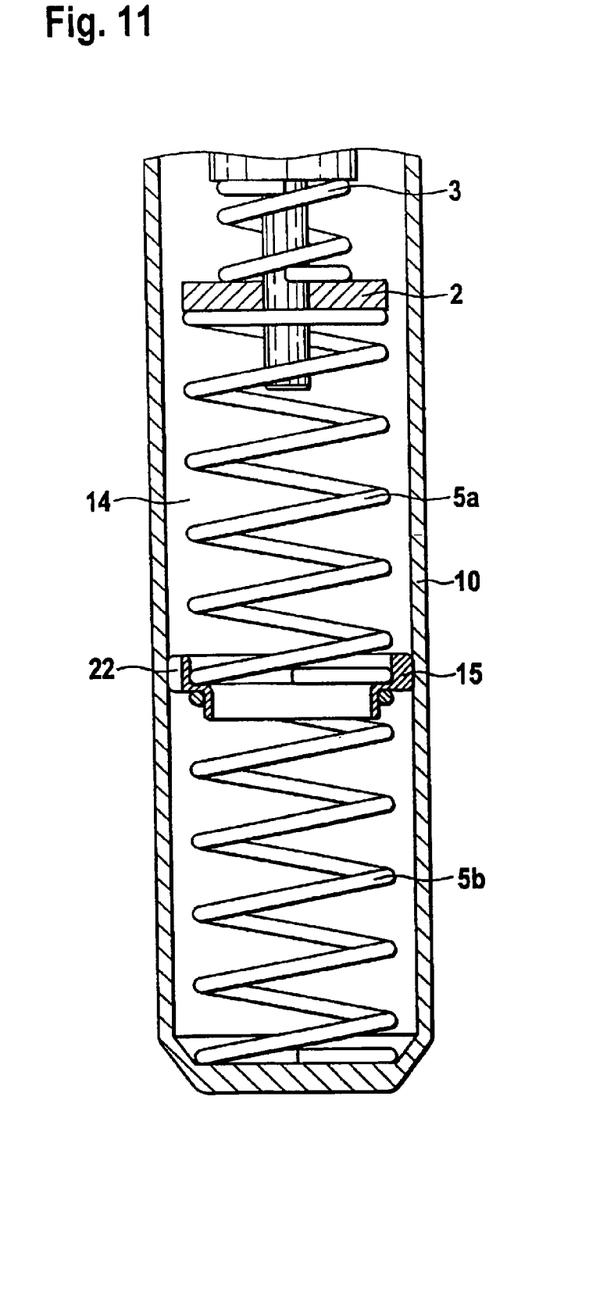
FIG. 11 is a longitudinal sectional view showing an embodiment of yet a further distance detection system of the present invention.

FIG. 11 shows a transmitter 2 in a cylinder 10, where one side of the transmitter is supported on the spring 3, while the other side is supported on a spring 5a. The spring 5a is to guided axially with respect to an additional spring 5b by a guide part 15 guidably mounted on the inside wall of the cylinder 10. Appropriate holes 22 are provided in the guide part 15 for the equalization of the damping medium inside the working space 14.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A piston-cylinder assembly, comprising:
    a cylinder having a top end, a bottom end, and an inside wall;
    a piston rod having a piston movably arranged for axial movement in said cylinder;
    a piston rod guide arranged in said cylinder for guiding the axial movement of said piston rod;
    a distance detection system for detecting a position of said piston in said cylinder, said distance detection system comprising a sensor and a transmitter, said sensor being mounted on one of said piston and said bottom end of said cylinder, wherein said transmitter moves a first distance in response to an axial displacement of said piston in said cylinder by a second distance different than said first distance, wherein said distance detection system determines said position of said piston in response to the difference between said first and second distances; and
    a first spring arranged between said transmitter and said piston and a second sprint arranged between said transmitter and said bottom end of said cylinder, said transmitter supported by said first spring and said second spring.

2. The piston-cylinder assembly of claim 1, wherein said first spring comprises a different spring rate than said second spring.

3. The piston-cylinder assembly of claim 2, wherein said one of said first and second springs between said transmitter and said one of said piston and said bottom end of said cylinder on which said sensor is mounted comprises a first spring rate and the other of said first and second springs comprises a second spring rate, said first spring rate being greater than said second spring rate.

4. The piston-cylinder assembly of claim 2, wherein at least one of said first and second springs comprises a plurality of spring elements, said piston-cylinder assembly further comprising a guide element arranged between each adjacent pair of said plurality of spring elements for guidance on said inside wall of said cylinder.

5. The piston-cylinder assembly of claim 1, wherein said transmitter is axially movably guided for movement on said sensor.

6. The piston-cylinder assembly of claim 1, wherein said transmitter is coaxial to and a distance away from said sensor.

7. The piston-cylinder assembly of claim 1, wherein said sensor comprises an end surface that works together with an end surface of the transmitter for detecting a position of said piston.

* * * * *